United States Patent
Kim (10) Patent No.: US 11,028,304 B2
(45) Date of Patent: *Jun. 8, 2021

(54) THERMALLY CONDUCTIVE POLYMER COMPOSITION FOR A HEAT SINK

(71) Applicant: Ticona LLC, Florence, KY (US)

(72) Inventor: Young Shin Kim, Erlanger, KY (US)

(73) Assignee: Ticona LLC, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/658,583

(22) Filed: Oct. 21, 2019

(65) Prior Publication Data

US 2020/0048523 A1 Feb. 13, 2020

Related U.S. Application Data

(63) Continuation of application No. 15/671,525, filed on Aug. 8, 2017, now Pat. No. 10,450,491.

(Continued)

(51) Int. Cl.
| | | |
|---|---|---|
| C09K 5/04 | (2006.01) |
| F21V 29/00 | (2015.01) |
| C08L 77/00 | (2006.01) |
| C09K 5/14 | (2006.01) |
| F28F 21/06 | (2006.01) |
| H01B 3/40 | (2006.01) |
| F21V 29/76 | (2015.01) |

(Continued)

(52) U.S. Cl.
CPC ............... C09K 5/14 (2013.01); C08L 77/06 (2013.01); F21V 29/767 (2015.01); F21V 29/87 (2015.01); F28F 21/06 (2013.01); *H01B 3/40* (2013.01); *C08L 2203/20* (2013.01); *F21Y 2115/10* (2016.08); *F28D 2021/0029* (2013.01)

(58) Field of Classification Search
CPC ... H01B 3/40; C09K 5/04; C09K 5/08; C09K 5/14; C09K 19/02; C08L 77/06; F21V 29/87; H01L 2924/00
See application file for complete search history.

(56) References Cited

U.S. PATENT DOCUMENTS 3,755,221 A 8/1973 Hitch
4,174,358 A 11/1979 Epstein
(Continued)

FOREIGN PATENT DOCUMENTS

CN 102492134 B 4/2014
CN 105419323 A 3/2016
(Continued)

OTHER PUBLICATIONS

Hwang "Thermal conductivity and mechanical properties of magnesium oxide reinforced polyamide-66 composites", Elastomers and Composites, vol. 50, No. 3, pp. 205-209 (2015).*
(Continued)

*Primary Examiner* — Mark Kopec
(74) *Attorney, Agent, or Firm* — Dority & Manning, P.A.

(57) ABSTRACT

A polymer composition that contains a polyamide is provided. The composition exhibits a Charpy unnotched impact strength of about 5 kJ/m² or more as measured at a temperature of 23° C. according to ISO Test No. 179-1:2010 and an in-plane thermal conductivity of about 15 W/m-K or more as determined in accordance with ASTM E 1461-13.

11 Claims, 1 Drawing Sheet

Related U.S. Application Data (60) Provisional application No. 62/371,952, filed on Aug. 8, 2016, provisional application No. 62/491,362, filed on Apr. 28, 2017.

(51) Int. Cl.
  *F21V 29/87* (2015.01)
  *C08L 77/06* (2006.01)
  *F28D 21/00* (2006.01)
  *F21Y 115/10* (2016.01)

(56) References Cited

U.S. PATENT DOCUMENTS

| | | | |
|---|---|---|---|
| 5,688,868 A | 11/1997 | Fish, Jr. | |
| 5,770,679 A | 6/1998 | Hayashi et al. | |
| 5,919,865 A | 7/1999 | Perret et al. | |
| 5,925,300 A | 7/1999 | Kurian et al. | |
| 5,929,178 A | 7/1999 | Shida et al. | |
| 5,965,668 A | 10/1999 | Perret et al. | |
| 5,965,689 A | 10/1999 | Perret et al. | |
| 5,969,014 A | 10/1999 | Webster et al. | |
| 6,011,102 A | 1/2000 | Shimojo et al. | |
| 6,075,091 A | 6/2000 | Tanaka et al. | |
| 6,077,905 A | 6/2000 | Perret et al. | |
| 6,107,388 A | 8/2000 | Sanpei et al. | |
| 6,117,561 A | 9/2000 | Jacquemet et al. | |
| 6,162,849 A * | 12/2000 | Zhuo | C08K 3/38 524/404 |
| 6,214,934 B1 | 4/2001 | Moriya et al. | |
| 6,225,411 B1 | 5/2001 | Dang et al. | |
| 6,225,412 B1 | 5/2001 | Chaffin et al. | |
| 6,228,948 B1 | 5/2001 | Flaris et al. | |
| 6,232,436 B1 | 5/2001 | Beck et al. | |
| 6,251,997 B1 | 6/2001 | Imai et al. | |
| 6,300,419 B1 | 10/2001 | Sehanobish et al. | |
| 6,306,972 B1 | 10/2001 | Ohkawa et al. | |
| 6,329,454 B1 | 12/2001 | Krabbenborg | |
| 6,339,123 B1 | 1/2002 | Raetzsch et al. | |
| 6,362,288 B1 | 3/2002 | Brewer et al. | |
| 6,395,832 B1 | 5/2002 | Pelliconi et al. | |
| 6,407,157 B2 | 6/2002 | Oyamada et al. | |
| 6,420,481 B2 | 6/2002 | Di-Benedetto et al. | |
| 6,414,068 B1 | 7/2002 | Sato et al. | |
| 6,429,250 B1 | 8/2002 | Rohrmann | |
| 6,433,047 B2 | 8/2002 | Nakamura et al. | |
| 6,441,072 B1 | 8/2002 | Havenith et al. | |
| 6,441,081 B1 | 8/2002 | Sadatoshi et al. | |
| 6,461,703 B1 | 10/2002 | Rigosi | |
| 6,476,138 B2 | 11/2002 | Sato et al. | |
| 6,548,181 B2 | 4/2003 | Beusen | |
| 6,569,955 B1 | 5/2003 | Brewer et al. | |
| 6,579,581 B2 | 6/2003 | Bartz et al. | |
| 6,605,655 B1 | 8/2003 | Kato et al. | |
| 6,608,130 B1 | 8/2003 | Zanka et al. | |
| 6,610,783 B1 | 8/2003 | Delius et al. | |
| 6,620,891 B2 | 9/2003 | Yu et al. | |
| 6,642,121 B2 | 11/2003 | Camalleri et al. | |
| 6,642,316 B1 | 11/2003 | Datta et al. | |
| 6,656,987 B2 | 12/2003 | Takashima et al. | |
| 6,659,955 B1 | 12/2003 | Marian, Jr. | |
| 6,673,855 B1 | 1/2004 | Braga et al. | |
| 6,683,125 B1 | 1/2004 | Augestad et al. | |
| 6,737,462 B2 | 5/2004 | Gittinger et al. | |
| 6,756,443 B2 | 6/2004 | Feinberg | |
| 6,767,953 B2 | 7/2004 | Ohkawa et al. | |
| 6,774,174 B2 | 8/2004 | Martens et al. | |
| 6,828,384 B2 | 12/2004 | Kakarala et al. | |
| 6,831,124 B2 | 12/2004 | McEnhill et al. | |
| 6,867,252 B1 | 3/2005 | Tomomatsu et al. | |
| 6,867,260 B2 | 3/2005 | Datta et al. | |
| 6,890,984 B2 | 5/2005 | Aramaki et al. | |
| 6,916,882 B2 | 7/2005 | Brant | |
| 6,927,258 B2 | 8/2005 | Datta et al. | |
| 6,943,215 B2 | 9/2005 | Stevens et al. | |
| 7,012,113 B2 | 3/2006 | Park et al. | |
| 7,060,754 B2 | 6/2006 | Stevens et al. | |
| 7,071,259 B2 | 7/2006 | Botros | |
| 7,087,680 B2 | 8/2006 | Pierini et al. | |
| 7,091,277 B2 | 8/2006 | Rydin et al. | |
| 7,094,835 B2 | 8/2006 | Datta et al. | |
| 7,109,269 B2 | 9/2006 | Stevens et al. | |
| 7,109,270 B2 | 9/2006 | Datta et al. | |
| 7,125,924 B2 | 10/2006 | Credali et al. | |
| 7,144,938 B1 | 12/2006 | Feinberg et al. | |
| 7,199,188 B2 | 4/2007 | Chou | |
| 7,208,536 B2 | 4/2007 | Lim et al. | |
| 7,217,766 B2 | 5/2007 | Datta et al. | |
| 7,238,747 B2 | 7/2007 | Brant | |
| 7,247,679 B2 | 7/2007 | Datta et al. | |
| 7,265,172 B2 | 9/2007 | Weber et al. | |
| 7,267,884 B2 | 9/2007 | Chou et al. | |
| 7,288,598 B2 | 10/2007 | Pelliconi et al. | |
| 7,307,125 B2 | 12/2007 | Chundury et al. | |
| 2,335,696 A1 | 2/2008 | Yalvac et al. | |
| 7,345,122 B2 | 3/2008 | Hong et al. | |
| 7,358,293 B2 | 4/2008 | Agarwal | |
| 7,365,143 B2 | 4/2008 | Ka et al. | |
| 7,365,144 B2 | 4/2008 | Ka et al. | |
| 7,375,162 B2 | 5/2008 | Strebel et al. | |
| 7,482,418 B2 | 1/2009 | Datta et al. | |
| 7,504,455 B2 | 3/2009 | Grein et al. | |
| 7,511,086 B2 | 3/2009 | Okamoto et al. | |
| 7,553,887 B2 | 6/2009 | Sugimoto et al. | |
| 7,629,416 B2 | 12/2009 | Li et al. | |
| 7,632,887 B2 | 12/2009 | Lin et al. | |
| 7,649,046 B2 | 1/2010 | Pham et al. | |
| 7,652,094 B2 | 1/2010 | Lin et al. | |
| 7,671,127 B2 | 3/2010 | Weber et al. | |
| 7,671,129 B2 | 3/2010 | Miura et al. | |
| 7,691,939 B2 | 4/2010 | Garagnani et al. | |
| 7,714,057 B2 | 5/2010 | Heck et al. | |
| 7,741,398 B2 | 6/2010 | Heck | |
| 7,754,814 B2 | 7/2010 | Barcus et al. | |
| 7,781,510 B2 | 8/2010 | Yalvac et al. | |
| 7,795,352 B2 | 9/2010 | Massari et al. | |
| 7,863,379 B2 | 1/2011 | Kapur et al. | |
| 7,879,931 B2 | 2/2011 | Mecklenburg et al. | |
| 7,906,586 B2 | 3/2011 | Weaver et al. | |
| 7,906,588 B2 | 3/2011 | Datta et al. | |
| 7,923,501 B2 | 4/2011 | Shimouse et al. | |
| 7,956,127 B2 | 6/2011 | Lee et al. | |
| 7,960,451 B2 | 6/2011 | Aramaki | |
| 7,960,473 B2 | 6/2011 | Kobayashi et al. | |
| 8,003,725 B2 | 8/2011 | Chapman et al. | |
| 8,022,166 B2 | 9/2011 | de Kraker et al. | |
| 8,039,540 B2 | 10/2011 | Pelliconi et al. | |
| 8,158,706 B2 | 4/2012 | Shimouse et al. | |
| 8,163,378 B2 | 4/2012 | Soliman et al. | |
| 8,183,312 B2 | 5/2012 | Pham et al. | |
| 8,227,550 B2 | 7/2012 | Masarati et al. | |
| 8,268,450 B2 | 9/2012 | Jang et al. | |
| 8,299,144 B2 | 10/2012 | Lee et al. | |
| 8,299,160 B2 | 10/2012 | Yamauchi et al. | |
| 8,309,659 B2 | 11/2012 | Masarati et al. | |
| 8,344,044 B2 | 1/2013 | Nakamura | |
| 8,404,324 B2 | 3/2013 | Lutz et al. | |
| 8,431,636 B2 | 4/2013 | Lee et al. | |
| 8,436,089 B2 | 5/2013 | Finlayson et al. | |
| 8,445,575 B2 | 5/2013 | Palmer et al. | |
| 8,481,636 B2 | 7/2013 | Kim et al. | |
| 8,501,900 B2 | 8/2013 | Buzinkai et al. | |
| 8,519,044 B2 | 8/2013 | Stockreiter et al. | |
| 8,529,821 B2 | 9/2013 | Walia et al. | |
| 8,541,075 B2 | 9/2013 | Nakamura | |
| 8,569,418 B2 | 10/2013 | Galvan et al. | |
| 8,586,663 B2 | 11/2013 | Hausmann | |
| 8,604,117 B2 | 12/2013 | Kobayashi et al. | |
| 8,618,209 B2 | 12/2013 | Lee et al. | |
| 8,669,310 B2 | 3/2014 | Nakagawa | |
| 8,686,088 B2 | 4/2014 | Sugimoto et al. | |
| 8,716,394 B2 | 5/2014 | Masarati et al. | |
| 8,722,805 B2 | 5/2014 | Filipe et al. | |
| 8,748,535 B2 | 6/2014 | Doshev et al. | |

(56) References Cited

U.S. PATENT DOCUMENTS

| | | |
|---|---|---|
| 8,779,051 B2 | 7/2014 | Kisin et al. |
| 8,791,206 B2 | 7/2014 | Asai et al. |
| 8,816,010 B2 | 8/2014 | Tranninger |
| 8,829,113 B2 | 9/2014 | Gaddi et al. |
| 8,889,781 B2 | 11/2014 | Lima et al. |
| 8,895,659 B2 | 11/2014 | Kock et al. |
| 8,906,479 B2 | 12/2014 | Chou et al. |
| 8,912,263 B2 | 12/2014 | Wolfschwenger et al. |
| 8,912,271 B2 | 12/2014 | Seliskar et al. |
| 8,952,107 B2 | 2/2015 | Tao et al. |
| 8,998,458 B2 | 4/2015 | Tankala et al. |
| 9,018,292 B2 | 4/2015 | Jeol et al. |
| 9,023,903 B2 | 5/2015 | Lima |
| 9,040,633 B2 | 5/2015 | Bernreitner et al. |
| 9,051,454 B2 | 6/2015 | Yi et al. |
| 9,051,459 B2 | 6/2015 | Van Rheenen et al. |
| 9,056,981 B2 | 6/2015 | Kim et al. |
| 9,056,982 B2 | 6/2015 | Bhatia |
| 9,090,750 B2 | 7/2015 | Rulkens et al. |
| 9,109,114 B2 | 8/2015 | Lima |
| 9,115,276 B2 | 8/2015 | Brandstetter et al. |
| 9,139,723 B2 | 9/2015 | Youn et al. |
| 9,150,715 B2 | 10/2015 | Tranninger et al. |
| 9,156,958 B2 | 10/2015 | Amici et al. |
| 9,175,157 B2 | 11/2015 | Noh et al. |
| 9,177,692 B2 | 11/2015 | Miyamoto et al. |
| 9,181,423 B2 | 11/2015 | Kock et al. |
| 9,193,865 B2 | 11/2015 | Lima |
| 9,200,151 B2 | 12/2015 | Kim et al. |
| 9,206,304 B2 | 12/2015 | Lederer et al. |
| 9,227,347 B2 | 1/2016 | Hardikar et al. |
| 9,243,140 B2 | 1/2016 | Walton et al. |
| 9,249,283 B2 | 2/2016 | Heikkila et al. |
| 9,260,585 B2 | 2/2016 | Sasaki et al. |
| 9,260,603 B2 | 2/2016 | Vilasagar et al. |
| 9,260,604 B2 | 2/2016 | Vilasagar et al. |
| 9,290,646 B2 | 3/2016 | Glogovsky et al. |
| 9,290,649 B2 | 3/2016 | Tranninger et al. |
| 9,328,219 B2 | 5/2016 | Gabriel et al. |
| 9,353,251 B2 | 5/2016 | Kito et al. |
| 9,353,262 B2 | 5/2016 | Tarbit et al. |
| 9,365,711 B2 | 6/2016 | Weeks |
| 9,388,312 B2 | 7/2016 | Bhatia |
| 9,416,261 B2 | 8/2016 | Glogovsky et al. |
| 9,428,637 B2 | 8/2016 | Kohler et al. |
| 9,434,870 B2 | 9/2016 | Raman et al. |
| 9,441,085 B2 | 9/2016 | Norfolk |
| 9,493,611 B2 | 11/2016 | Masunaga et al. |
| 9,505,912 B2 | 11/2016 | Eibeck et al. |
| 9,512,301 B2 | 12/2016 | Nakagawa et al. |
| 9,527,989 B2 | 12/2016 | Herklots et al. |
| 9,567,462 B2 | 2/2017 | Stoeppelmann et al. |
| 9,597,462 B2 | 2/2017 | Moore |
| 9,587,079 B2 | 3/2017 | Langenfelder et al. |
| 9,631,070 B2 | 4/2017 | Stoeppelmann et al. |
| 9,676,938 B2 | 6/2017 | Davies |
| 9,783,677 B2 | 10/2017 | Kawamura et al. |
| 9,997,274 B2 | 6/2018 | Kotani et al. |
| 10,023,695 B2 | 7/2018 | Brule et al. |
| 10,259,878 B2 | 4/2019 | Zhang et al. |
| 10,407,605 B2 * | 9/2019 | Kim .......................... C08K 3/38 |
| 2001/0018485 A1 | 8/2001 | Matsuoka et al. |
| 2002/0115818 A1 | 8/2002 | Ogo et al. |
| 2003/0004248 A1 | 1/2003 | Wakamura et al. |
| 2004/0063857 A1 | 4/2004 | Vathauer et al. |
| 2004/0102559 A1 | 5/2004 | Oyamada et al. |
| 2004/0209977 A1 | 10/2004 | Hossan |
| 2005/0020762 A1 | 1/2005 | Chou et al. |
| 2006/0202373 A1 | 9/2006 | Guntherberg et al. |
| 2007/0235697 A1 | 10/2007 | Borade et al. |
| 2007/0235698 A1 | 10/2007 | Borade et al. |
| 2007/0238832 A1 | 10/2007 | Borade et al. |
| 2007/0293607 A1 | 12/2007 | Arakawa et al. |
| 2008/0090945 A1 | 4/2008 | Langrick et al. |
| 2008/0161503 A1 | 7/2008 | Chou et al. |
| 2008/0167415 A1 | 7/2008 | Stoeppelmann et al. |
| 2009/0149590 A1 | 6/2009 | Eroshov et al. |
| 2010/0028580 A1 | 2/2010 | Palmer et al. |
| 2010/0029819 A1 | 2/2010 | Palmer et al. |
| 2010/0029821 A1 | 2/2010 | Palmer et al. |
| 2010/0063191 A1 | 3/2010 | Hirono |
| 2010/0183837 A1 | 7/2010 | Hochstetter et al. |
| 2010/0305257 A1 | 12/2010 | Trouillet-Fonti et al. |
| 2011/0014486 A1 | 1/2011 | Sakamoto et al. |
| 2011/0015324 A1 | 1/2011 | Hara et al. |
| 2011/0018485 A1 | 8/2011 | Maeda et al. |
| 2011/0204282 A1 | 8/2011 | Yoshihara et al. |
| 2011/0224346 A1 | 9/2011 | Eibeck et al. |
| 2011/0240930 A1 | 10/2011 | Stoeppelmann et al. |
| 2011/0311728 A1 | 12/2011 | Ott et al. |
| 2012/0165448 A1 | 6/2012 | Lee et al. |
| 2013/0012642 A1 | 1/2013 | Mecklenburg et al. |
| 2013/0072622 A1 | 3/2013 | Miyamoto et al. |
| 2013/0150517 A1 | 6/2013 | Tarbit et al. |
| 2013/0171394 A1 | 7/2013 | Chou et al. |
| 2013/0172470 A1 | 7/2013 | Chou et al. |
| 2013/0228728 A1 | 9/2013 | Mathur et al. |
| 2013/0281589 A1 | 10/2013 | Thompson et al. |
| 2014/0051795 A1 | 2/2014 | Inamdar |
| 2014/0066561 A1 | 3/2014 | Pfleghar et al. |
| 2014/0107274 A1 | 4/2014 | Salek et al. |
| 2014/0114005 A1 | 4/2014 | Norfolk |
| 2014/0187694 A1 | 7/2014 | Jang et al. |
| 2014/0252265 A1 | 9/2014 | Gabriel et al. |
| 2014/0288220 A1 | 9/2014 | Duncan et al. |
| 2014/0309367 A1 | 10/2014 | Bradley |
| 2014/0363654 A1 | 12/2014 | Roth et al. |
| 2014/0364569 A1 | 12/2014 | Kito et al. |
| 2015/0076395 A1 | 3/2015 | Negandhi et al. |
| 2015/0099839 A1 | 4/2015 | Benighaus et al. |
| 2015/0104598 A1 | 4/2015 | Bhatia |
| 2015/0148437 A1 | 5/2015 | Langenfelder et al. |
| 2015/0159015 A1 | 6/2015 | Benighaus et al. |
| 2015/0187459 A1 | 7/2015 | Fairchild et al. |
| 2015/0203682 A1 | 7/2015 | Bhatia |
| 2015/0210841 A1 | 7/2015 | Seliskar et al. |
| 2015/0225541 A1 | 8/2015 | Oda et al. |
| 2015/0232617 A1 | 8/2015 | Masunaga et al. |
| 2015/0266998 A1 | 9/2015 | Zaltieri et al. |
| 2015/0299550 A1 | 10/2015 | Kusunoki et al. |
| 2015/0343681 A1 | 12/2015 | Mizumoto et al. |
| 2015/0344689 A1 | 12/2015 | Gopal et al. |
| 2016/0024287 A1 | 1/2016 | Rohrmann et al. |
| 2016/0046807 A1 | 2/2016 | Adur |
| 2016/0053093 A1 | 2/2016 | Han et al. |
| 2016/0073496 A1 | 3/2016 | Vincent |
| 2016/0152826 A1 | 6/2016 | Kawamura et al. |
| 2016/0215109 A1 | 7/2016 | Kawamura et al. |
| 2016/0272788 A1 | 9/2016 | Stoppelmann et al. |
| 2016/0280914 A1 | 9/2016 | Thomas et al. |
| 2016/0319118 A1 | 11/2016 | Massari et al. |
| 2017/0002188 A1 | 1/2017 | Neuteboom et al. |
| 2017/0073496 A1 | 3/2017 | Buzinkai |
| 2017/0079385 A1 | 3/2017 | Mizumoto et al. |
| 2017/0081473 A1 | 3/2017 | Benstead et al. |
| 2017/0101530 A1 | 4/2017 | Zheng et al. |
| 2018/0148622 A1 | 5/2018 | Takezawa et al. |
| 2019/0256703 A1 * | 8/2019 | Kim .................... C08K 5/0083 |

FOREIGN PATENT DOCUMENTS

| | | |
|---|---|---|
| CN | 103694720 B | 6/2016 |
| EP | 1041109 | 10/2000 |
| EP | 0997496 | 3/2006 |
| JP | H0796519 | 4/1995 |
| JP | H11129246 | 5/1999 |
| JP | 2005187809 | 7/2005 |
| JP | 2006189701 | 7/2006 |
| JP | 2014093427 A | 5/2014 |
| WO | WO 1996/026241 | 8/1996 |
| WO | WO1999019382 | 10/1998 |
| WO | WO 2009/050268 | 4/2009 |
| WO | WO 2014/179070 | 4/2014 |

(56) References Cited

FOREIGN PATENT DOCUMENTS

| WO | WO 2015/134922 | 3/2015 |
| WO | WO 2015/175775 | 5/2015 |
| WO | WO 2016/120760 | 8/2016 |

OTHER PUBLICATIONS

Chinese Search Report for CN 201780054579.1 dated May 8, 2020, 1 page.
Extended European Search Report for EP 17 84 0153 dated Feb. 7, 2020, 11 pages.
McClelland et al., Rheology and fibre orientation in the injection moulding of long fibre reinforced nylon 66 composites, Composites Manufacturing. 1 No. 1, 1990, 15-25.
International Search Report and Written Opinion for PCT/US2017/045935 dated Oct. 25, 2017, 11 pages.
International Preliminary Report on Patentability dated Feb. 21, 2019, 10 pages.

* cited by examiner

US 11,028,304 B2

THERMALLY CONDUCTIVE POLYMER COMPOSITION FOR A HEAT SINK

RELATED APPLICATION

The present application is a continuation of U.S. patent application Ser. No. 15/671,525 having a filing dated of Aug. 8, 2017, which claims priority to U.S. provisional applications Ser. No. 62/371,952, filed on Aug. 8, 2016, and 62/491,362, filed on Apr. 28, 2017, which are incorporated herein by reference thereto.

BACKGROUND OF THE INVENTION

Metallic materials are commonly employed in thermally conductive heat sinks to dissipate heat, such as in semiconductor packaging, headlamps, etc. In these applications, the metallic material is typically tooled or machined from a bulk metal into the desired configuration. Unfortunately, however, the geometries that can be formed from metal articles are very limited to the inherent limitations associated with the machining or tooling process. This places severe limitations on the efficiency of the heat sink design. Various attempts have thus been made to use thermally conductive polymer compositions to form the heat sinks. While successful in some circumstances, polymer compositions having a high thermal conductivity value tend to have relatively poor structural integrity and strength, and conversely, compositions having a high degree of structural integrity and strength tend to have a relatively low thermal conductivity value. Thus, it has been traditionally difficult to use thermally conductive polymer compositions in applications that require a high degree of strength and integrity, such as in exterior automotive applications (e.g., headlamps) and industrial applications. As such, a need currently exists for a thermally conductive polymer composition having a high thermal conductivity and good structural integrity.

SUMMARY OF THE INVENTION

In accordance with one embodiment of the present invention, a polymer composition is disclosed that comprises a polyamide, a thermally conductive particulate material, an epoxy-functionalized olefin copolymer, and inorganic fibers. The polymer composition exhibits a Charpy unnotched impact strength of about 5 kJ/m$^2$ or more as measured at a temperature of 23° C. according to ISO Test No. 179-1:2010 and an in-plane thermal conductivity of about 15 W/m-K or more as determined in accordance with ASTM E 1461-13.

In accordance with another embodiment of the present invention, a heat sink is disclosed that comprises a polymer composition. The polymer composition comprises a polyamide and thermally conductive particulate material, and the composition exhibits a Charpy unnotched impact strength of about 5 kJ/m$^2$ or more as measured at a temperature of 23° C. according to ISO Test No. 179-1:2010 and an in-plane thermal conductivity of about 15 W/m-K or more as determined in accordance with ASTM E 1461-13. The heat sink may be employed in a light assembly (e.g., headlamp for a vehicle, tunnel light, etc.).

Other features and aspects of the present invention are set forth in greater detail below.

BRIEF DESCRIPTION OF THE FIGURE

A full and enabling disclosure of the present invention, including the best mode thereof to one skilled in the art, is set forth more particularly in the remainder of the specification, including reference to the accompanying FIGURE, in which.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a thermally conductive polymer composition that can exhibit a unique combination of impact strength (e.g., Charyp unnotched impact strength) and tensile properties (e.g., tensile strength and tensile modulus) that enables it to be used in complex heat sink designs. For example, the polymer composition may exhibit a Charpy unnotched impact strength of about 5 kJ/m$^2$ or more, in some embodiments about 6 kJ/m$^2$ or more, in some embodiments from about 7 to about 30 kJ/m$^2$, and in some embodiments, from about 8 to about 25 kJ/m$^2$, measured at 23° C. according to ISO Test No. 179-1:2010) (technically equivalent to ASTM D256-10, Method B). The composition may also exhibit a tensile strength of about 40 Megapascals ("MPa") or more, in some embodiments about 50 MPa or more, in some embodiments from about 55 to about 200 MPa, and in some embodiments, from about 60 to about 150 MPa, as well as a tensile modulus of about 9,000 MPa or more, in some embodiments about 10,000 MPa or more, in some embodiments from about 11,000 to about 50,000 MPa, and in some embodiments, from about 12,000 to about 25,000 MPa, wherein the tensile properties are determined in accordance with ISO Test No. 527:2012 (technically equivalent to ASTM D638-14 at 23° C. The composition may also exhibit a flexural strength of from about 70 to about 500 MPa, in some embodiments from about 80 to about 400 MPa, and in some embodiments, from about 90 to about 300 MPa and/or a flexural modulus of from about 10,000 MPa to about 30,000 MPa, in some embodiments from about 12,000 MPa to about 25,000 MPa, and in some embodiments, from about 14,000 MPa to about 20,000 MPa. The flexural properties may be determined in accordance with ISO Test No. 178:2010 (technically equivalent to ASTM D790-10) at 23° C.

Contrary to conventional wisdom, it is has been discovered that such a balance high impact strength and tensile strength can be achieved without adversely impacting thermal conductivity. In this manner, the composition is capable of creating a thermal pathway for heat transfer away from a part so that "hot spots" can be quickly eliminated and the overall temperature of the part can be lowered during use. More particularly, the composition has an in-plane thermal conductivity of about 15 W/m-K or more, in some embodiments about 20 W/m-K or more, and in some embodiments, from about 20 to about 40 W/m-K, as determined in accordance with ASTM E 1461-13. The composition (and heat sinks formed therefrom) may also exhibit a relatively high thermal conductivity in the −z direction (height), −x direction (length), and −y direction (width) in accordance with ASTM E1461-13. For instance, the −z direction thermal conductivity may be about 7 W/m-K or more, in some embodiments about 8 W/m-K or more, and in some embodiments, from about 9 to about 15 W/m-K.

Further, the composition is also capable of maintaining its color even after exposure to ultraviolet light. Such UV color stability can be quantified by measuring the absorbance of the composition with a spectrophotometer before and after exposure to ultraviolet light (e.g., after 750 hours or 1,000 hours). The ultraviolet light may be supplied using a xenon arc weatherometer (Ci4000) according to ISO Test method 4892-2 (Cycle 1—irradiation of 0.5 W/m², black panel temperature of 65° C., relative humidity of 50%, and cycle time of 102 minutes of light with no spray and 18 minutes of light with front specimen spray). Likewise, color measurement may be performed using a DataColor 600 Spectrophotometer utilizing an integrating sphere with measurements made using the specular excluded mode. Color coordinates may be calculated according to ASTM D2244-11 under illuminant D65, 10° observer, using CIELAB units. This method defines three color coordinates L*, a*, and b*, which correspond to three characteristics of a perceived color based on the opponent theory of color perception and are defined as follows:

L*=Luminosity value ranging from 0 to 100, where 0=black and 100=white;

a*=Red/green axis, ranging from −150 to 100; positive values are reddish and negative values are greenish; and b*=Yellow/blue axis, ranging from −100 to 100; positive values are yellowish and negative values are bluish.

Because CIELAB color space is somewhat visually uniform, the delta value (ΔE) may be calculated that represents the total absolute color difference between two colors (e.g., prior to and following UV aging) as perceived by a human using the following equation:

$$\Delta E = [(\Delta L^*)^2 + (\Delta a^*)^2 \pm (\Delta b^*)^2]^{1/2}$$

wherein, ΔL* is the luminosity value of the color of the specimen following UV aging subtracted from the luminosity value of the color of the specimen prior to UV aging, Δa* is the red/green axis value of the color of the specimen following UV aging subtracted from the red/green axis value of the color of the specimen prior to UV aging; and Δb* is the yellow/blue axis value of the color of the specimen following UV aging subtracted from the yellow/blue axis value of the color of the specimen prior to UV aging. In CIELAB color space, each ΔE unit is approximately equal to a "just noticeable" difference between two colors and is therefore a good measure for an objective device-independent color specification system that may be used for the purpose of expressing differences in color. The composition of the present invention may, for instance, exhibit a ΔE value of about 10 or less, in some embodiments about 5 or less, and in some embodiments, from about 0.1 to about 3, after being exposed to ultraviolet light for 750 hours at a total exposure level of 1,377 kJ/m².

In addition, the polymer composition can also have excellent antistatic behavior. Such antistatic behavior can be characterized by a relatively low surface and/or volume resistivity as determined in accordance with IEC 60093. For example, the polymer composition may exhibit a surface resistivity of about 1,000 ohms or less, in some embodiments from about 1 to about 800 ohms, and in some embodiments, from about 200 to about 600 ohms. Likewise, the polymer composition may also exhibit a volume resistivity of about 10 ohm-cm or less, in some embodiments about 5 ohm-cm or less, and in some embodiments, from about 0.5 to about 2 ohm-cm.

The present inventors have discovered that the ability to achieve a polymer composition with such a unique combination of properties can be achieved through selective control over the nature of the components employed in the composition, and their relative concentration. For example, the composition may employ a polyamide in combination with a thermally conductive particulate material, an epoxy-functionalized olefin polymer, and inorganic fibers. The thermally conductive particulate material is typically employed in an amount of from about 50 to about 350 parts, in some embodiments from about 80 to about 300 parts, in some embodiments from about 100 parts to about 250 parts, and in some embodiments, from about 105 to about 200 parts by weight per 100 parts by weight of the polyamide. The epoxy-functionalized olefin copolymer may likewise be employed in an amount of from about 1 to about 30 parts, in some embodiments from about 3 to about 20 parts, and in some embodiments, from about 5 to about 15 parts by weight per 100 parts by weight of the polyamide, while the inorganic fibers may be employed in an amount of from about 20 to about 80 parts, in some embodiments from about 30 to about 75 parts, and in some embodiments, from about 40 to about 70 parts by weight per 100 parts by weight of the polyamide. For example, the thermally conductive particulate material typically constitutes from about 20 wt. % to about 60 wt. %, in some embodiments from about 25 wt. % to about 55 wt. %, and in some embodiments, from about 30 wt. % to about 50 wt. % of the polymer composition, the epoxy-functionalized olefin copolymer typically constitutes from about 0.1 wt. % to about 20 wt. %, in some embodiments from about 0.5 wt. % to about 15 wt. %, and in some embodiments, from about 1 wt. % to about 10 wt. % of the polymer composition, and the inorganic fibers typically constitute from about 1 wt. % to about 50 wt. %, in some embodiments from about 5 wt. % to about 40 wt. %, and in some embodiments, from about 10 wt. % to about 30 wt. % of the polymer composition. Polyamides also typically constitute from about 20 wt. % to about 70 wt. %, in some embodiments from about 25 wt. % to about 60 wt. %, and in some embodiments, from about 30 wt. % to about 50 wt. % of the polymer composition.

Various embodiments of the present invention will now be described in more detail.

I. Polyamide

Polyamides generally have a CO—NH linkage in the main chain and are obtained by condensation of a diamine and a dicarboxylic acid, by ring opening polymerization of lactam, or self-condensation of an amino carboxylic acid. For example, the aromatic polyamide may contain aliphatic repeating units derived from an aliphatic diamine, which typically has from 4 to 14 carbon atoms. Examples of such diamines include linear aliphatic alkylenediamines, such as 1,4-tetramethylenediamine, 1,6-hexanediamine, 1,7-heptanediamine, 1,8-octanediamine, 1,9-nonanediamine, 1,10-decanediamine, 1,11-undecanediamine, 1,12-dodecanediamine, etc.; branched aliphatic alkylenediamines, such as 2-methyl-1,5-pentanediamine, 3-methyl-1,5 pentanediamine, 2,2,4-trimethyl-1,6-hexanediamine, 2,4,4-trimethyl-1,6-hexanediamine, 2,4-dimethyl-1,6-hexanediamine, 2-methyl-1,8-octanediamine, 5-methyl-1,9-nonanediamine, etc.; as well as combinations thereof. Of course, aromatic and/or alicyclic diamines may also be employed. Furthermore, examples of the dicarboxylic acid component may include aromatic dicarboxylic acids (e.g., terephthalic acid, isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4, 4'-dicarboxylic acid, 4,4'-biphenyldicarboxylic acid, etc.), aliphatic dicarboxylic acids (e.g., adipic acid, sebacic acid, etc.), and so forth. Examples of lactams include pyrrolidone, aminocaproic acid, caprolactam, undecanlactam, lauryl lactam, and so forth. Likewise, examples of amino carboxylic acids include amino fatty acids, which are compounds of the aforementioned lactams that have been ring opened by water.

In certain embodiments, an "aliphatic" polyamide is employed that is formed only from aliphatic monomer units (e.g., diamine and dicarboxylic acid monomer units). Particular examples of such aliphatic polyamides include, for instance, polyamide 4 (poly-α-pyrrolidone), polyamide 6 (polycaproamide), polyamide 11 (polyundecanamide), polyamide 12 (polydodecanamide), polyamide 46 (polytetramethylene adipamide), polyamide 66 (polyhexamethylene adipamide), polyamide 610, and polyamide 612. Polyamide 6 and polyamide 66 are particularly suitable. Of course, it is also possible to include aromatic monomer units in the polyamide such that it is considered semi-aromatic (contains both aliphatic and aromatic monomer units) or wholly aromatic (contains only aromatic monomer units). For instance, suitable semi-aromatic polyamides may include poly(nonamethylene terephthalamide) (PA9T), poly(nonamethylene terephthalamide/nonamethylene decanediamide) (PA9T/910), poly(nonamethylene terephthalamide/nonamethylene dodecanediamide) (PA9T/912), poly(nonamethylene terephthalamide/11-aminoundecanamide) (PA9T/11), poly(nonamethylene terephthalamide/12-aminododecanamide) (PA9T/12), poly(decamethylene terephthalamide/11-aminoundecanamide) (PA 10T/11), poly(decamethylene terephthalamide/12-aminododecanamide) (PA10T/12), poly(decamethylene terephthalamide/decamethylene decanediamide) (PA10T/1010), poly(decamethylene terephthalamide/decamethylene dodecanediamide) (PA10T/1012), poly(decamethylene terephthalamide/tetramethylene hexanediamide) (PA10T/46), poly(decamethylene terephthalamide/caprolactam) (PA10T/6), poly(decamethylene terephthalamide/hexamethylene hexanediamide) (PA10T/66), poly(dodecamethylene lerephthalamide/dodecamelhylene dodecanediarnide) (PA12T/1212), poly(dodecam ethylene terephthalamide/caprolactam) (PA12T/6), poly(dodecamethylene terephthalamide/hexamethylene hexanediamide) (PA12T/66), and so forth.

The polyamide employed in the composition of the present invention is typically crystalline or semi-crystalline in nature and thus has a measurable melting temperature. The melting temperature is typically relatively high such that the composition can provide a substantial degree of heat resistance to the resulting part. For example, the polyamide may have a melting temperature of about 220° C. or more, in some embodiments from about 240° C. to about 400° C., and in some embodiments, from about 250° C. to about 380° C. The polyamide may also have a relatively high glass transition temperature, such as about 30° C. or more, in some embodiments about 40° C. or more, and in some embodiments, from about 45° C. to about 150° C. The glass transition and melting temperatures may be determined as is well known in the art using differential scanning calorimetry ("DSC"), such as determined by ISO Test No. 11357-2:2013 (glass transition) and 11357-3:2011 (melting).

II. Thermally Conductive Particulate Material

The thermally conductive particulate material employed in the polymer composition generally has a high specific surface area. The specific surface area may be, for example, about 0.5 m²/g or more, in some embodiments about 1 m²/g or more, and in some embodiments, from about 2 to about 40 m²/g. The specific surface area can be determined according to standard methods such as by the physical gas adsorption method (B.E.T. method) with nitrogen as the adsorption gas, as is generally known in the art and described by Brunauer, Emmet, and Teller (J. Amer. Chem. Soc., vol. 60, February, 1938, pp. 309-319). The particulate material may also have a powder tap density of from about 0.2 to about 1.0 g/cm³, in some embodiments from about 0.3 to about 0.9 g/cm³, and in some embodiments, from about 0.4 to about 0.8 g/cm³, such as determined in accordance with ASTM B527-15.

The thermally conductive particulate material also has a high intrinsic thermal conductivity, such as about 50 W/m-K or more, in some embodiments about 100 W/m-K or more, and in some embodiments, about 150 W/m-K or more. Examples of such materials may include, for instance, boron nitride (BN), aluminum nitride (AlN), magnesium silicon nitride ($MgSiN_2$), graphite (e.g., expanded graphite), silicon carbide (SiC), carbon nanotubes, carbon black, metal oxides (e.g., zinc oxide, magnesium oxide, beryllium oxide, zirconium oxide, yttrium oxide, etc.), metallic powders (e.g., aluminum, copper, bronze, brass, etc.), etc., as well as combinations thereof. Graphite is particularly suitable for use in the composition of the present invention. In fact, in certain embodiments, graphite may constitute a majority of the thermally conductive particulate material employed in the polymer composition, such as about 50 wt. % or more, in some embodiments, about 70 wt. % or more, and in some embodiments, from about 90 wt. % to 100 wt. % of the thermally conductive particulate material.

The thermally conductive particulate material typically has an average size (e.g., diameter or length) in the range of about 1 to about 100 micrometers, in some embodiments from about 2 to about 80 micrometers, and in some embodiments, from about 5 to about 60 micrometers, such as determined using laser diffraction techniques in accordance with ISO 13320:2009 (e.g., with a Horiba LA-960 particle size distribution analyzer). In certain embodiments, the particulate material may have a "flake" shape in that it has a relatively high aspect ratio (e.g., average length or diameter divided by average thickness), such as about 4:1 or more, in some embodiments about 8:1 or more, and in some embodiments, from about 10:1 to about 2000:1. The average thickness may, for instance, be about 10 micrometers or less, in some embodiments from about 0.01 micrometers to about 8 micrometers, and in some embodiments, from about 0.05 micrometers to about 5 micrometers.

III. Epoxy-Functionalized Olefin Copolymer

As stated above, an olefin copolymer is also employed that is "epoxy-functionalized" in that it contains, on average, two or more epoxy functional groups per molecule. The copolymer generally contains an olefinic monomeric unit that is derived from one or more α-olefins. Examples of such monomers include, for instance, linear and/or branched α-olefins having from 2 to 20 carbon atoms and typically from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin monomers are ethylene and propylene. The copolymer may also contain an epoxy-functional monomeric unit. One example of such a unit is an epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate. Other suitable monomers may also be employed to help achieve the desired molecular weight.

Of course, the copolymer may also contain other monomeric units as is known in the art. For example, another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. In one particular embodiment, for example, the copolymer may be a terpolymer formed from an epoxy-functional (meth)acrylic monomeric component, α-olefin monomeric component, and non-epoxy functional (meth)acrylic monomeric component. The copolymer may, for instance, be poly(ethylene-co-butylacrylate-co-glycidyl methacrylate), which has the following structure:

wherein, x, y, and z are 1 or greater.

The relative portion of the monomeric component(s) may be selected to achieve a balance between epoxy-reactivity and melt flow rate. More particularly, high epoxy monomer contents can result in good reactivity with the matrix polymer, but too high of a content may reduce the melt flow rate to such an extent that the copolymer adversely impacts the melt strength of the polymer blend. Thus, in most embodiments, the epoxy-functional (meth)acrylic monomer(s) constitute from about 1 wt. % to about 20 wt. %, in some embodiments from about 2 wt. % to about 15 wt. %, and in some embodiments, from about 3 wt. % to about 10 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. The result melt flow rate is typically from about 1 to about 30 grams per 10 minutes ("g/10 min"), in some embodiments from about 2 to about 20 g/10 min, and in some embodiments, from about 3 to about 15 g/10 min, as determined in accordance with ASTM D1238-13 at a load of 2.16 kg and temperature of 190° C.

One example of a suitable epoxy-functionalized copolymer that may be used in the present invention is commercially available from Arkema under the name LOTADER® AX8840. LOTADER® AX8840, for instance, has a melt flow rate of 5 g/10 min and has a glycidyl methacrylate monomer content of 8 wt. %. Another suitable copolymer is commercially available from DuPont under the name ELVALOY® PTW, which is a terpolymer of ethylene, butyl acrylate, and glycidyl methacrylate and has a melt flow rate of 12 g/10 min and a glycidyl methacrylate monomer content of 4 wt. % to 5 wt. %.

IV. Inorganic Fibers

The inorganic fibers generally have a high degree of tensile strength relative to their mass. For example, the ultimate tensile strength of the fibers (determined in accordance with ASTM D2101) is typically from about 1,000 to about 15,000 MPa, in some embodiments from about 2,000 MPa to about 10,000 MPa, and in some embodiments, from about 3,000 MPa to about 6,000 MPa. The high strength fibers may be formed from materials that are also electrically insulative in nature, such as glass, ceramics (e.g., alumina or silica), etc., as well as mixtures thereof. Glass fibers are particularly suitable, such as E-glass, A-glass, C-glass, D-glass, AR-glass, R-glass, S1-glass, S2-glass, etc., and mixtures thereof.

The fibers may also have a relatively high length, which is believed to further enhance thermal conductivity. For example, the fibers may have a volume average length of from about 1 to about 400 micrometers, in some embodiments from about 80 to about 250 micrometers, in some embodiments from about 100 to about 200 micrometers, and in some embodiments, from about 110 to about 180 micrometers. The fibers may also have a narrow length distribution. That is, at least about 70% by volume of the fibers, in some embodiments at least about 80% by volume of the fibers, and in some embodiments, at least about 90% by volume of the fibers have a length within the range of from about 1 to about 400 micrometers, in some embodiments from about 80 to about 250 micrometers, in some embodiments from about 100 to about 200 micrometers, and in some embodiments, from about 110 to about 180 micrometers. In addition to possessing the length characteristics noted above, the fibers may also have a relatively high aspect ratio (average length divided by nominal diameter) to help improve the mechanical properties of the resulting polymer composition. For example, the fibers may have an aspect ratio of from about 2 to about 50, in some embodiments from about 4 to about 40, and in some embodiments, from about 5 to about 20 are particularly beneficial. The fibers may, for example, have a nominal diameter of about 5 to about 35 micrometers, and in some embodiments, from about 8 to about 30 micrometers.

V. Other Components

A wide variety of additional additives can also be included in the polymer composition, such as lubricants, pigments, antioxidants, UV stabilizers, surfactants, waxes, flame retardants, anti-drip additives, additional polymers, and other materials added to enhance properties and processability. In certain embodiments, for example, the composition may contain a UV stabilizer. Suitable UV stabilizers may include, for instance, benzophenones, benzotriazoles (e.g., 2-(2-hydroxy-3,5-di-α-cumylphenyl)-2H-benzotriazole (TINUVIN® 234), 2-(2-hydroxy-5-tert-octylphenyl)-2H-benzotriazole (TINUVIN® 329), 2-(2-hydroxy-3-α-cumyl-5-tert-octylphenyl)-2H-benzotriazole (TINUVIN® 928), etc.), triazines (e.g., 2,4-diphenyl-6-(2-hydroxy-4-hexyloxyphenyl)-s-triazine (TINUVIN® 1577)), sterically hindered amines (e.g., bis(2,2,6,6-tetramethyl-4-piperidyl) sebacate (TINUVIN® 770) or a polymer of dimethyl succinate and 1-(2-hydroxyethyl)-4-hydroxy-2,2,6,6-tetramethyl-4-piperidine (TINUVIN®622)), and so forth, as well as mixtures thereof. When employed, such UV stabilizers typically constitutes from about 0.05 wt. % to about 2 wt. % in some embodiments from about 0.1 wt. % to about 1.5 wt. %, and in some embodiments, from about 0.2 wt. % to about 1.0 wt. % of the composition. If desired, other polymers may also be employed in combination with the polyamide. For example, suitable polymers for use in the composition may include polyarylene sulfides (e.g., polyphenylene sulfide), polyesters (e.g., polybutylene terephthalate, polyethylene terephthalate, etc.), polyolefins, liquid crystalline polymers, polyaryletherketones (e.g., polyetheretherketone), polycarbonates, polyphenylene oxides, and so forth.

VI. Formation

The polyamide, thermally conductive particulate material, epoxy-functionalized olefin copolymer, inorganic fibers, and other optional additives may be melt processed or blended together. The components may be supplied separately or in combination to an extruder that includes at least one screw rotatably mounted and received within a barrel (e.g., cylindrical barrel) and may define a feed section and a melting section located downstream from the feed section along the length of the screw. It is typically desired to minimize the number of distributive and/or dispersive mixing elements that are employed within the mixing and/or melting sections of the extruder. In this manner, the extent to which the length of the fibers is degraded during extrusion can be minimized, which enhances thermal conductivity as noted above. The fibers are added a location downstream from the point at which the polyamide is supplied (e.g., hopper). The fibers may also be supplied to the extruder at a location downstream from the polyamide to further minimize fiber degradation. The thermally conductive particulate material and epoxy-functionalized olefin copolymer are also typically added to the extruder a location downstream from the point at which the polyamide is supplied. One or more of the sections of the extruder are typically heated, such as within a temperature range of from about 200° C. to about 450° C., in some embodiments, from about 220° C. to about 350° C., and in some embodiments, from about 250° C. to about 350° C. to form the composition. The speed of the screw may be selected to achieve the desired residence time, shear rate, melt processing temperature, etc. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

Regardless of the particular manner in which it is formed, the present inventors have discovered that the resulting polymer composition can possess excellent thermal properties. For example, the melt viscosity of the polymer composition may be low enough so that it can readily flow into the cavity of a mold having small dimensions. In one particular embodiment, the polymer composition may have a melt viscosity of from about 400 to about 1,000 Pascal-seconds ("Pa-s"), in some embodiments from about 450 to about 900 Pa-s, and in some embodiments, from about 500 to about 800 Pa-s, determined at a shear rate of 1000 seconds$^{-1}$. Melt viscosity may be determined in accordance with ISO Test No. 11443:2005 at a temperature that is 15° C. higher than the melting temperature of the composition (e.g., 255° C.).

VII. Heat Sink

Figure 1:
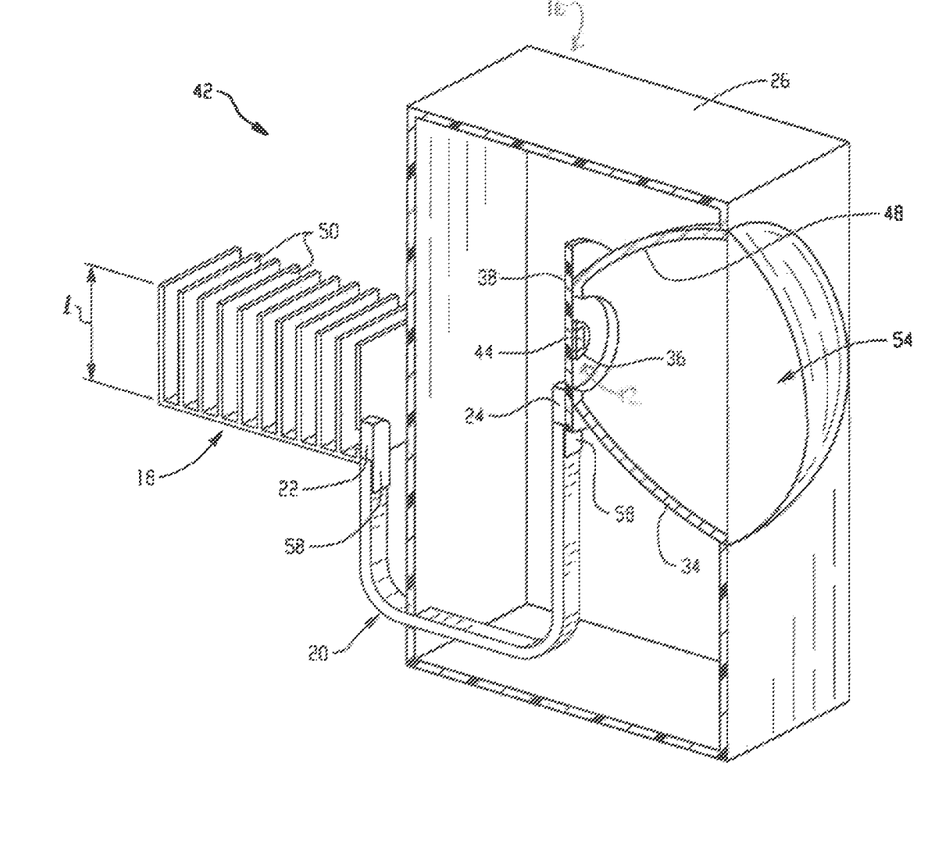
The Drawing is a perspective view of one embodiment of a heat sink that may be formed accordance with the present invention, shown in this embodiment as being attached to a light assembly.

As noted above, the polymer composition of the present invention may be used to form a "heat sink" that is capable of removing, conducting, and/or absorbing heat from another part or surface. Such heat sinks may be formed using a variety of different processes, such as by molding (e.g., injection molding, compression molding, etc.), casting, thermoforming, etc. For example, the heat sink may be molded using a one-component injection molding process in which granules formed from the polymer composition are injected into a mold, shaped, and thereafter cooled. The design and shape of the resulting heat sink may vary as is known in the art and can depend upon a variety of different factors, such as the specific application, the degree of heat transfer needed, the location of the heat sink, and the amount of available space. In one embodiment, for example, the heat sink may contain a plurality of spaced apart heat-dissipating elements (e.g., fins, fibers, etc.) that increase the overall surface area of the heat skin. The number of heat-dissipating elements may vary, but is typically from 2 to 20, in some embodiments from 4 to 18, and in some embodiments, from 6 to 16. The height of the heat-dissipating elements is typically from about 1 to about 100 millimeters, in some embodiments from about 2 to about 60 millimeters, and in some embodiments, from about 5 to about 40 millimeters. The heat-dissipating elements may project outwardly from a base, which may be generally planar and have any shape desired, such as rectangular, square, circular, etc. The direction that the elements extend from the base may vary as desired, such as perpendicular to a major surface of the base, radially from the base, etc. Referring to the Drawing, for example, one particular embodiment of a heat sink 18 is shown. As depicted, the heat sink 18 contains a base from which a plurality of heat-radiating elements 50 (e.g., fins) project in a direction perpendicular to a major surface of the base to define a height "I." If desired, any portion of the heat sink 18 (e.g., fins and/or base) may be formed from the polymer composition of the present invention.

The heat sink may be disposed in proximity to any type of surface or part to remove heat therefrom. For example, the heat sink may be disposed in proximity to a light source (e.g., light emitting diode ("LED")) or other electronic equipment, such as used in computers, phones, electronic control units, etc. In one particular embodiment, the heat sink may be disposed in proximity to an LED module that is, for instance, positioned in a light assembly, such as a tunnel light, headlamp for a vehicle, etc. Referring again to the Drawing, for example, the heat sink 18 may be disposed in proximity to an LED module 12, which may be mounted within a light assembly 16. As shown, the heat sink 18 may be located external to an outer housing 26 of the light assembly 16. In such embodiments, a connector 20 may be attached at one end 22 of the heat sink 18 and at another end 24 to the LED module 12, and configured to conduct heat away from the LED module 12 and to the heat sink 18. The connector 20 may be attached using a securing device 58, such as a snap, rivet, bolt, screw, clamp, stud, weld, braze, solder, adhesive, etc. It is typically desired that the securing device 58 is also thermally conductive, such as a metal or a polymer composition. Of course, in other embodiments, the heat sink 18 may also be attached directly to the housing 26 or LED module 12, or may even be formed integrally with such components.

The LED module 12 may contain one or more light emitting diodes 36 (e.g., two), which can be located on a substrate 38. A LED circuit 44 is also positioned on the substrate 38. A reflector 48 assists in directing light from the LED module in the desired direction. The reflector 48 may include a shell 34 with a reflective coating on an inner surface thereof, such as a metallic coating. Current can be supplied to the LED module 12 from the battery of the vehicle to cause the diodes 36 to emit light, which then passes through a lens 54 and projected outwardly from the light assembly 16 by the reflector 48. As the LED emits light, it also creates heat, which can be removed by the heat sink 18.

The present invention may be better understood with reference to the following examples.

Test Methods

Melt Viscosity:

The melt viscosity (Pa-s) may be determined in accordance with ISO Test No. 11443:2005 at a shear rate of 1000 $s^{-1}$ and temperature 15° C. above the melting temperature (e.g., 255° C.) using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Melting Temperature:

The melting temperature ("Tm") may be determined by differential scanning calorimetry ("DSC") as is known in the art. The melting temperature is the differential scanning calorimetry (DSC) peak melt temperature as determined by ISO Test No. 11357-2:2013. Under the DSC procedure, samples were heated and cooled at 20° C. per minute as stated in ISO Standard 10350 using DSC measurements conducted on a TA Q2000 Instrument.

Tensile Modulus, Tensile Stress, and Tensile Elongation at Break: Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus and Flexural Stress:

Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Unotched Charpy Impact Strength:

Unotched Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). Specimens may be cut from the center of a multi-purpose bar using a single tooth milling machine. The testing temperature may be 23° C.

Notched Charpy Impact Strength:

Notched Charpy properties may be tested according to ISO Test No. ISO 179-1:2010) (technically equivalent to ASTM D256-10, Method B). This test may be run using a Type A notch (0.25 mm base radius) and Type 1 specimen size (length of 80 mm, width of 10 mm, and thickness of 4 mm). Specimens may be cut from the center of a multi-purpose bar using a single tooth milling machine. The testing temperature may be 23° C.

Surface/Volume Resistivity:

The surface and volume resistivity values may be determined in accordance with IEC 60093 (equivalent to ASTM D257-07). According to this procedure, a standard specimen (e.g., 1 meter cube) is placed between two electrodes. A voltage is applied for sixty (60) seconds and the resistance is measured. The surface resistivity is the quotient of the potential gradient (in V/m) and the current per unit of electrode length (in A/m), and generally represents the resistance to leakage current along the surface of an insulating material. Because the four (4) ends of the electrodes define a square, the lengths in the quotient cancel and surface resistivities are reported in ohms, although it is also common to see the more descriptive unit of ohms per square. Volume resistivity is also determined as the ratio of the potential gradient parallel to the current in a material to the current density. In SI units, volume resistivity is numerically equal to the direct-current resistance between opposite faces of a one-meter cube of the material (ohm-cm).

Comparative Example 1

A sample is formed from 39.6 wt. % polyamide 66 (Ultramid® 8202 HS, BASF), 45 wt. % flake graphite (3715 RF174, Asbury), 10 wt. % zinc oxide, 4.5 wt. % polypropylene, and 0.9 wt. % of a maleic anhydride grafted polypropylene (Epolene® E-43, Westlake).

Comparative Example 2

A sample is formed from 36.8 wt. % polyamide 66 (Ultramid® 8202 HS, BASF), 45 wt. % flake graphite (3715 RF174, Asbury), 10 wt. % zinc oxide, 4.5 wt. % polypropylene, and 3.7 wt. % of epoxy-functionalized copolymer that is a terpolymer formed from ethylene, butyl acrylate, and glycidyl methacrylate (Elvaloy® PTW, DuPont).

Example 1

A sample is formed from 35.9 wt. % polyamide 66 (Ultramid® 8202 HS, BASF), 40 wt. % flake graphite (3715 RF174, Asbury), 20 wt. % glass fibers (995-13P, Owens Corning), 3.7 wt. % of Elvaloy® PTW, DuPont 0.2 wt. % Tinuvin® 234 (BASF), and 0.2 wt. % Tinuvin® 622 (BASF). The samples of Comparative Examples 1-2 and Example 1 are tested for thermal and mechanical properties, the results of which are provided below in Table 1.

TABLE 1

|  | Comparative Ex. 1 | Comparative Ex. 2 | Example 1 |
| --- | --- | --- | --- |
| Thermal Conductivity (in plane) (W/mK) | 24 | 25 | 21 |
| Charpy Notched (kJ/m$^2$) | 2 | 3 | 4 |
| Charpy Unnotched (kJ/m$^2$) | 4 | 6 | 9 |
| Tensile Strength (MPa) | 37 | 36 | 61 |

TABLE 1-continued

|  | Comparative Ex. 1 | Comparative Ex. 2 | Example 1 |
|---|---|---|---|
| Tensile Modulus (MPa) | 8,198 | 6,763 | 12,456 |
| Tensile Elongation at Break (%) | 0.8 | 0.8 | 0.7 |
| Flexural Strength (MPa) | 58 | 59 | 100 |
| Flexural Modulus (MPa) | 9,000 | 7,659 | 14,215 |
| Flexural Elongation (%) | 1.0 | 1.3 | 1.2 |
| Surface Resistivity (ohms) | — | — | 500 |
| Volume Resistivity (ohm-cm) | — | — | 1 |

The samples are also formed into a heat sink containing eleven (11) fins having a height of 24.15 millimeters. The fins project from a rectangular base having a length of 95.1 millimeters, width of 37.9 millimeters, and thickness of 3.05 millimeters. The distance from the front fin to the back fin is 85.7 millimeters. The heat sink is subjected to a "ball drop test" in which dart-shaped balls weighing 200 grams and 500 grams are separately dropped onto end sections of the heat sink from a height of 50 centimeters. After testing, a part is deemed to "pass" if no broken sections are observed. For Comparative Example 1, none of the parts were observed to pass the test for either the 200-gram or 500-gram balls. For Comparative Example 2, none of the parts were observed to pass the test for the 500-gram ball and about 65% of the parts were observed to pass the test for the 200-gram ball. For Example 1, 100% of the parts were observed to pass the test for the 200-gram and 500-gram balls.

Example 1 was also tested for UV color stability as described in the test referenced above. After exposure to UV light (1,377 kJ/m$^2$) for 750 hours, it was determined that the $\Delta E$ value was 1.48 ($\Delta a^*$=−0.05, $\Delta b^*$=−0.17, and $\Delta L^*$=1.47). In comparison, the $\Delta E$ value for Comparative Example 1 was 11.67 ($\Delta a^*$=−0.43, $\Delta b^*$=0.59, and $\Delta L^*$=11.65).

The fins are also removed from the heat sink to determine the thermal conductivity in the −z direction (direction of fins), −x direction (length of sink), and −y direction (width of sink) in accordance with ASTM E1461-13. For Example 1, it was determined that the −z direction thermal conductivity was 10 W/m-K, the −x direction thermal conductivity was 30 W/m-K, and the y-direction thermal conductivity was 15 W/m-K. In contrast, for Comparative Example 1, it was determined that the −z direction thermal conductivity was 6 W/m-K, the −x direction thermal conductivity was 31 W/m-K, and the y-direction thermal conductivity was 14 W/m-K.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A heat sink comprising a polymer composition, which comprises a polyamide and thermally conductive particulate material, wherein the thermally conductive material constitutes from about 20 wt. % to about 55 wt. % of the polymer composition, and wherein the polymer composition exhibits a Charpy unnotched impact strength of about 5 kJ/m$^2$ or more as measured at a temperature of 23° C. according to ISO Test No. 179-1:2010 and an in-plane thermal conductivity of about 15 W/m-K or more as determined in accordance with ASTM E 1461-13.

2. The heat sink of claim 1, wherein the polymer composition exhibits a Charpy unnotched impact strength of from about 8 to about 25 kJ/m$^2$ as measured at a temperature of 23° C. according to ISO Test No. 179-1:2010 and an in-plane thermal conductivity of from about 20 to about 40 W/m-K as determined in accordance with ASTM E 1461-13.

3. The heat sink of claim 2, wherein the heat sink contains a plurality of spaced apart heat-dissipating elements formed from the polymer composition.

4. The heat sink of claim 3, wherein the heat-dissipating elements are fins.

5. The heat sink of claim 3, wherein the heat-dissipating elements project outwardly from a base, wherein the base is formed from the polymer composition.

6. A heat sink comprising a polymer composition, which comprises a polyamide and thermally conductive particulate material, wherein the polymer composition exhibits a Charpy unnotched impact strength of about 5 kJ/m$^2$ or more as measured at a temperature of 23° C. according to ISO Test No. 179-1:2010, a tensile strength of 40 MPa or more as measured in accordance with ISO Test No. 527:2012, and an in-plane thermal conductivity of about 15 W/m-K or more as determined in accordance with ASTM E 1461-13.

7. A light assembly comprising a heat sink, the heat sink comprising a polymer composition which comprises a polyamide and thermally conductive particulate material, wherein the polymer composition exhibits a Charpy unnotched impact strength of about 5 kJ/m$^2$ or more as measured at a temperature of 23° C. according to ISO Test No. 179-1:2010, a tensile strength of 40 MPa or more as measured in accordance with ISO Test No. 527:2012, and an in-plane thermal conductivity of about 15 W/m-K or more as determined in accordance with ASTM E 1461-13.

8. The light assembly of claim 7, wherein the assembly contains an LED module that contains one or more light emitting diodes, the heat sink being disposed in proximity to the LED module.

9. The light assembly of claim 8, wherein the light assembly contains an outer housing, and further wherein the heat sink is located external to the housing.

10. The light assembly of claim 8, wherein the heat sink is attached to the LED module through a connector.

11. The light assembly of claim 8, wherein the heat sink is attached to the housing.

* * * * *